United States Patent [19]
Kelley

[11] 3,846,936
[45] Nov. 12, 1974

[54] METHOD AND APPARATUS FOR TRANSPLANTING

[76] Inventor: Albert W. Kelley, R.D. 1, Box 28, Creamridge, N.J. 08514

[22] Filed: Nov. 8, 1972

[21] Appl. No.: 304,764

Related U.S. Application Data

[63] Continuation-in-part of Ser. No. 152,182, June 11, 1971, abandoned.

[52] U.S. Cl.............................. 47/58, 47/34, 47/37, 47/32
[51] Int. Cl.............................................. A01g 9/02
[58] Field of Search............ 47/1, 34, 37, 58, 33, 32

[56] References Cited
UNITED STATES PATENTS

| | | |
|---|---|---|
| 786,547 | 4/1905 | Chamberlin...................... 47/33 UX |
| 986,395 | 3/1911 | King...................................... 47/33 |
| 1,709,860 | 4/1929 | Lovett................................... 47/37 |
| 1,886,690 | 11/1932 | Janssen................................. 47/37 |
| 2,669,065 | 2/1954 | Clegg..................................... 47/37 |
| 2,814,161 | 11/1957 | Hawkins............................. 47/37 X |
| 3,373,668 | 3/1968 | Moore et al. ...................... 47/33 X |
| 3,662,490 | 5/1972 | Childs..................................... 47/1 |

FOREIGN PATENTS OR APPLICATIONS 4,464 0/1909 Great Britain

Primary Examiner—Robert E. Bagwill

[57] ABSTRACT

An agricultural method and apparatus for transplanting a plant from a smaller to a larger container, wherein the plant is inverted on a filling support with the roots surrounded by a larger container for receiving growing medium, and subsequently obverted to an upright position on a perforate growing support.

10 Claims, 7 Drawing Figures

PATENTED NOV 12 1974  3,846,936

3,846,936

METHOD AND APPARATUS FOR TRANSPLANTING

CROSS-REFERENCES TO RELATED APPLICATIONS

This application is a continuation-in-part of my copending patent application Ser. No. 152,182 filed June 11, 1971, for PLANT HUSBANDRY METHOD, now abandoned.

BACKGROUND OF THE INVENTION

As is rapidly becoming apparent in the field of plant husbandry, due to the scarcity and high cost of competent labor, plant husbandry methods must lend themselves to mechanization or automation or suffer economically.

While the parent application, referred to hereinbefore, concerned itself with unique and improved methods of root pruning and transplanting, it has been found possible to achieve even greater advantageous results by eliminating the need for root pruning and providing for relatively high speed transplanting accomplished by automation equipment.

SUMMARY OF THE INVENTION

It is, therefore, an important object of the present invention to provide a unique and highly improved method and apparatus for plant husbandry which effectively eliminates the need for root pruning, permits of relatively high speed, mass transplanting by automatic equipment, eliminating the need for digging, and which optimizes conditions permitting of rapid and healthy plant growth.

Other objects of the present invention will become apparent upon reading the following specification and referring to the accompanying drawings, which form a material part of this disclosure.

The invention accordingly consists in the features of construction, combinations of elements, and arrangements of parts and method steps, which will be exemplified in the following description, and of which the scope will be indicated by the appended claims.

DESCRIPTION OF THE PREFERRED EMBODIMENTS

Figure 1:
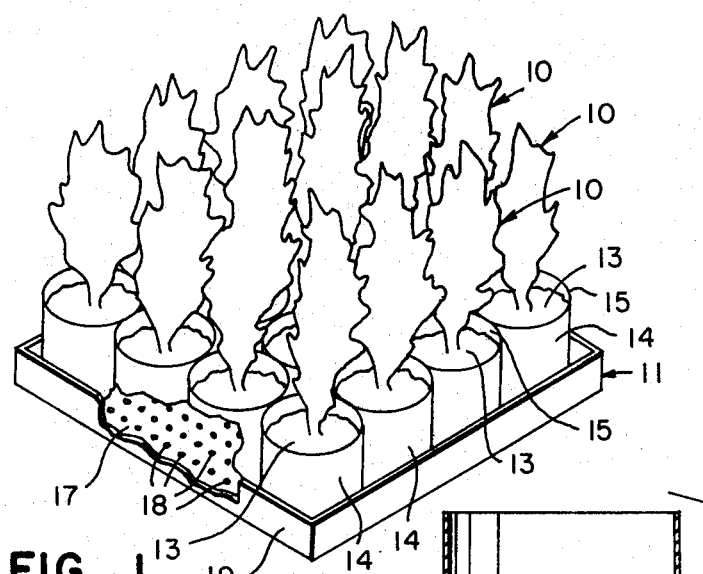
FIG. 1 is a top perspective view showing a quantity of plants in relatively small sleeve containers growing in accordance with the teachings of the present invention, being partly broken away to illustrate the structure of a supporting box or growing support.

Referring now more particularly to the drawings, and specifically to FIG. 1 thereof, there is shown therein a group of plants 10 arranged in side by side relation within and seated on a growing support or box 11. In this condition, the box 11 may rest on a suitable ground surface, or the like, and the plants watered and fed for proper growing.

Each of the plants 10, which may be considered as relatively small plants, has its lower root portion embedded in a growing medium or soil, which is encased or surrounded by an open ended cylindrical plastic sleeve or container 14.

That is, the sleeve containers 14, which may be of somewhat flexible plastic, have their lower and upper ends open, the upper end portion 15 extending upwardly beyond the upper or top surface of the growing medium 13 so as to provide a receptacle or space for retaining water and nutrient.

The growing support or box 11 includes a generally flat bottom wall 17 which is perforate or reticulate, say being formed with a multitude of through holes or perforations 18. The bottom wall openings 18 are sufficiently small to effectively preclude the passage therethrough of roots, while passing moisture both downwardly from the growing medium 13 to the nether earth region, and upwardly from the earth to the growing medium.

The box bottom wall 17 may be of sheet metal, if desired, and the box may be provided with peripherally extending, upstanding side walls 19 serving to regidify the box and retain the plants 10 in position on the bottom wall 17.

In practice, it is satisfactory to employ a square box of about two foot on each side, and utilize 16 small plants 10 each contained in a sleeve container of about six-inch diameter.

In this condition, the plants are suitably supported for growing, being well adapted to receive nutrient and water, while permitting of removal without requiring digging up, or the like, as the root system of each plant is substantially contained within its respective sleeve 14. Further, growing proceeds without the need for weeding between plants, as the growth of weeds is effectively eliminated by the box bottom wall 17.

Figure 2:
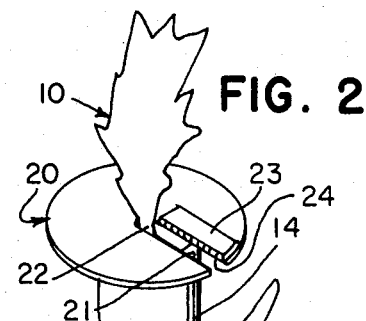
FIG. 2 is a top perspective view showing one of the plants of FIG. 1 in an early stage of the transplanting method of the instant invention.

When it is desired to transplant one of the relatively small plants 10, it may be removed from the box 11, and a generally flat filling support 20 associated with the plant, as seen in FIG. 2. More particularly, the filling support or plate 20 may be round or disc-like, as illustrated, having a generally radial cutout or notch 21 extending inwardly from the periphery to the approximate center of the support. The cutout 21 is adapted to receive the stem 22 of plant 10, with the filling support resting on the upper end of small sleeve container 14, generally concentric therewith. A flap or cover 23 may be mounted on the filling support or plate 20 for swinging movement into and out of closing relation with the notch 21, as by a suitable hinge 24, or other construction.

With the filling support in position over the body of growing medium 13, circumposed about the plant stem 22, and the notch 21 closed by closure flap 23, the assembly of plant 10 and filling support 20 is inverted and located on suitable spaced mounting means 25. This condition is shown in FIG. 3, the filling support 20 having its marginal regions resting on mounting means 25, with the plant 10 depending beneath the filling support, and the growing medium 13 and contained roots, together with the encompassing sleeve 14, all superposed on the filling support.

Figures 3, 4:
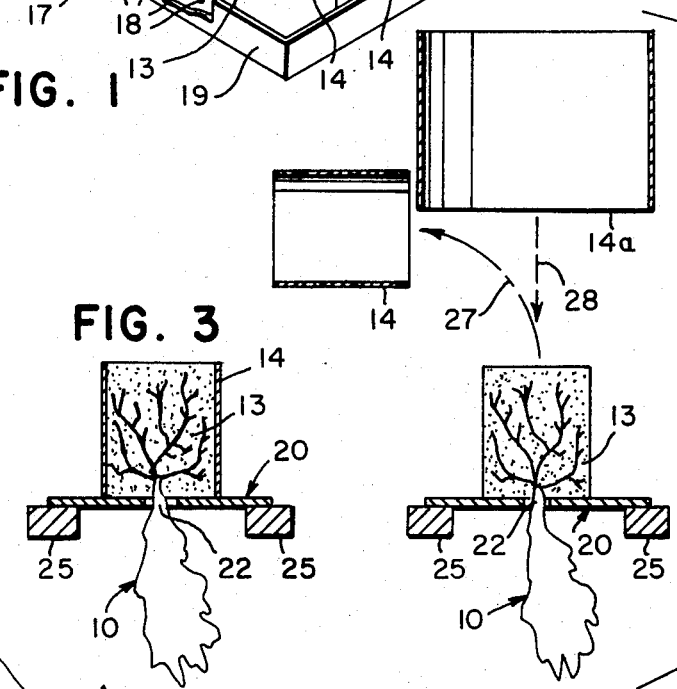
FIG. 3 is a sectional elevational view showing a slightly later step in the instant method of transplanting.
FIG. 4 is an elevational view showing a slightly later stage of the transplanting method.

In this position, the relatively small sleeve container 14 may be removed upwardly, see FIG. 4, in the direction of arrow 27, thereby being slipped from the growing medium 13. A larger, open-ended, generally cylindrical sleeve or container 14a, which may also be advantageously fabricated of semiflexible plastic, may be spacedly circumposed about the now uncontained growing medium 13, say by movement of the larger sleeve 14a in the direction of arrow 28. Further, the larger sleeve 14a is sized for snug reception of and close conforming engagement about the periphery of filling support 20. That is, the now lowermost end region of container sleeve 14a snugly engages about the periphery of filling support 20, so that the filling support is received in the end region of the sleeve to the depth or thickness of the filling support. This condition is shown in FIG. 5.

In this condition, the space within the larger sleeve 14a surrounding the original growing medium 13 may be conveniently filled, as by automatic dispensing equipment, with additional growing medium 13a. That is, prior repotting or transplanting procedures required supporting of the original growing medium or "ball" in elevated position, and the difficult introduction of additional growing medium beneath the leaves and branches of the plant. This was a difficult and wasteful procedure, requiring considerable time and concomitant expense.

Figure 5:
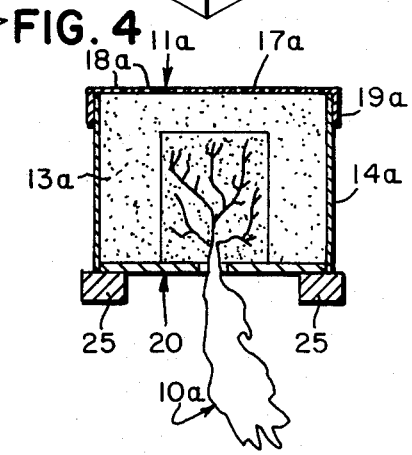
FIG. 5 is a sectional elevational view showing a later stage in the instant method of transplanting.

After filling of the larger open-ended sleeve container 14a to the now upper end thereof as seen in FIG. 5, say by suitable automatic equipment, a box 11a may be placed in inverted position over the container. The box may be generally square or rectangular, say having a square bottom wall 17a provided with through openings or perforations 18a, and peripheral side walls 19a. As illustrated, the rectangular dimension on each side of the box 11a, interiorly thereof, may be approximately equal to the external diameter of larger sleeve 14a. By this selection of dimensions a single plant 10a will occupy each box 11a.

Figure 6:
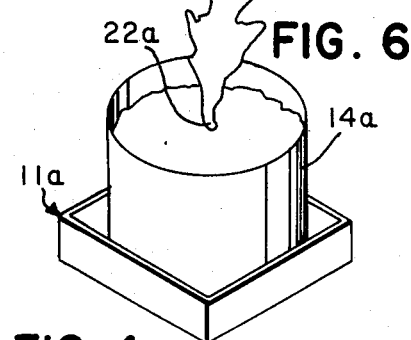
FIG. 6 is a top perspective view showing the transplanted plant in a large sleeve container, and illustrating the growing position.

The assembly of sleeve container 14a, box 11a and contents thereof, including plant 10a and filling support or disc 20 may now be inverted, as a unit, and the filling support removed from the assembly. This condition is shown in FIG. 6. Removal of the filling support requires only that the notch 21 be opened, as by movement of closure flap 23, and withdrawal of the filling support from from the upper region of container 14a while plant 22a passes through open slot 21. This will leave a nutrient reception space or well in the upper region of container 14a. The assembly of FIG. 6 may rest on the earth or other suitable surface to continue growing to full customer size, or for subsequent replanting, as desired.

Figure 7:
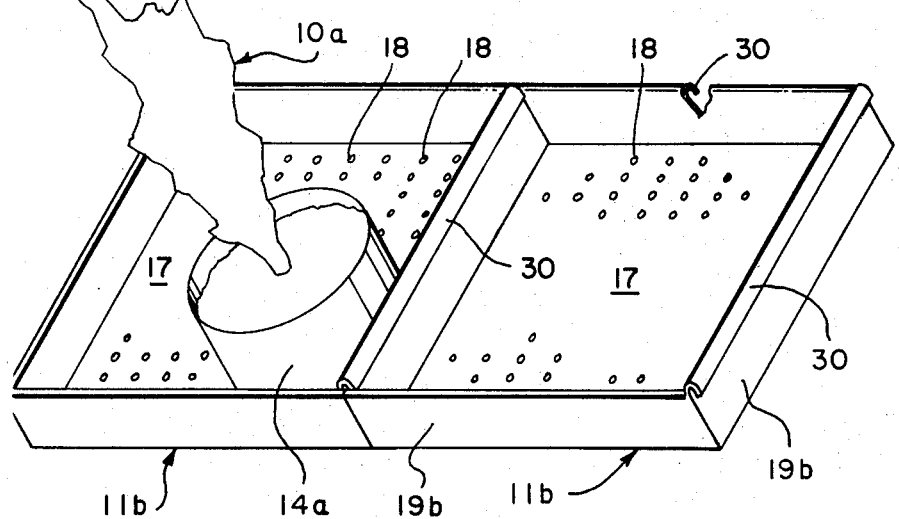
FIG. 7 is a top perspective view showing a growing position of plant and illustrating a slightly modified embodiment of apparatus.

If preferred, the replanted plant 14a may be contained in an intermediate box, as at 11b in FIG. 7. By way of example and without limiting intent, the sleeve container 14a may be of 1 foot diameter, and the growing supports or boxes 11b of 2 feet on a side, so as to each contain four plants 10a.

As the growing supports 11, 11a and 11b are all rectangular, and may be square, the location of a plurality of such boxes in adjacent side-by-side relation on the ground will effectively minimize or eliminate the growing of weeds between plants, to save substantial costs in weeding.

Further, if the growing supports or boxes are provided with interfitting formations to effectively close the spaces between boxes, the growth of plants therebetween will be minimized or obviated. The growing supports or boxes 11b of FIG. 7 show one side interfitting formation, being a flange 30 extending along two sides 19b of each box having an inverted generally U-shaped cross-section for receiving the upper edge region of the next adjacent unflanged box side wall 19b.

From the foregoing it is seen that the present invention provides a method and apparatus for growing and transplanting plants which is admirably well-suited for automation, effectively eliminates or minimizes weeding and digging-up of plants, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. In the method of transplanting a plant from a small diameter sleeve container to a large diameter sleeve container, the steps which comprise: placing a plant having its roots and growing medium contained in a small sleeve in an inverted position on and spaced within the bounds of a generally flat filling support having an opening with the roots and growing medium above the filling support and the stem depending through the filling support opening, placing a large sleeve container about the roots and growing medium with its lower end closed by the filling support, filling the large sleeve container with additional growing medium horizontally and vertically, placing a perforated growing support on the large sleeve container while the plant is inverted, inverting the plant to an upright position on the growing support, and removing the filling support.

2. The method of transplanting according to claim 1, further characterized in placing the large sleeve container about the filling support, so that the filling support leaves a water receiving space in an upper region of the large sleeve container when the plant is inverted and the filling support is removed from the container.

3. The method of transplanting according to claim 1, further characterized in placing said growing support on a growing surface for passage of moisture through the perforations of said growing support while suppressing the passage therethrough of roots.

4. The method of transplanting according to claim 3, further characterized in placing the large sleeve container snugly about the filling support, so that the filling support leaves a water receiving space in the upper region of the large sleeve container when the plant is inverted and the filling support removed.

5. The method of transplanting according to claim 1, said growing support being rectangular, and placing said growing support on a ground surface for proximate location with additional growing supports to suppress the growth of weeds between plants.

6. Apparatus for plant husbandry, said apparatus comprising a mounting means, a rigid filling support of ample breadth between opposite edges and having a notch extending inwardly from one edge for receiving a depending plant stem with the plant roots and growing medium uppermost and resting on the filling support spaced intermediate said opposite edges and with the filling support having its outer portions resting on said mounting means, a sleeve sized for spaced circumposition about said roots and growing medium and snug circumposition about said filling support to receive additional growing medium, and a perforated growing support for location over the additional growing medium and sleeve to support the same upon inversion and placement on a ground support.

7. Apparatus according to claim 6, said filling support being of sufficient thickness so that removal of said filling support after filling leaves a water receiving space in said sleeve.

8. Apparatus for plant husbandry according to claim 6, said growing support being generally rectangular for location in adjacent relation with additional growing supports to suppress the growth of weeds between plants.

9. Apparatus for plant husbandry according to claim 8, in combination with edge formations on said growing supports for interfitting relation with adjacent growing supports to assure weed suppression between growing supports.

10. Apparatus according to claim 6, in combination with a closure flap adjacent to said notch for opening and closing the latter.

* * * * *